US010900556B2

(12) United States Patent
Kato

(10) Patent No.: US 10,900,556 B2
(45) Date of Patent: Jan. 26, 2021

(54) DRIVE POWER TRANSMISSION APPARATUS FOR VEHICLE

(71) Applicant: TOYOTA JIDOSHA KABUSHIKI KAISHA, Toyota (JP)

(72) Inventor: Yu Kato, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 16/223,709

(22) Filed: Dec. 18, 2018

(65) Prior Publication Data

US 2019/0195334 A1 Jun. 27, 2019

(30) Foreign Application Priority Data

Dec. 21, 2017 (JP) .................................. 2017-245432

(51) Int. Cl.
*F16H 57/04* (2010.01)
*B01D 35/027* (2006.01)

(52) U.S. Cl.
CPC ..... *F16H 57/0404* (2013.01); *F16H 57/0441* (2013.01); *B01D 35/0273* (2013.01); *F16H 57/0483* (2013.01)

(58) Field of Classification Search
CPC ... F16H 57/0402–0404; F16H 57/0452; F16H 57/0443; B01D 35/0273
See application file for complete search history.

(56) References Cited

U.S. PATENT DOCUMENTS

| | | | | |
|---|---|---|---|---|
| 3,371,793 A | * | 3/1968 | Fowler | B01D 35/0273 210/445 |
| 5,049,274 A | * | 9/1991 | Leason | B29C 66/5416 210/445 |
| 7,845,500 B2 | * | 12/2010 | Hueppchen | B01D 35/0273 210/130 |
| 7,998,347 B2 | * | 8/2011 | Pekarsky | B01D 29/05 210/253 |
| 8,292,036 B2 | * | 10/2012 | Nishida | F16H 57/0402 184/6.2 |
| 8,397,750 B2 | * | 3/2013 | Fujita | F16H 57/0402 123/196 AB |
| 9,975,070 B2 | * | 5/2018 | Stausberg | B01D 35/005 |
| 2005/0139534 A1 | * | 6/2005 | Peet | B01D 35/0273 210/167.02 |
| 2011/0284453 A1 | * | 11/2011 | Toyoshima | B01D 35/0273 210/435 |

FOREIGN PATENT DOCUMENTS

| | | | | |
|---|---|---|---|---|
| JP | 2007152233 A | * | 6/2007 | ......... F16H 57/0402 |
| JP | 2009-180301 A | | 8/2009 | |
| JP | 2015-068488 A | | 4/2015 | |

* cited by examiner

*Primary Examiner* — Ernesto A Suarez
*Assistant Examiner* — James J Taylor, II
(74) *Attorney, Agent, or Firm* — Oliff PLC

(57) ABSTRACT

A drive power transmission apparatus for a vehicle, includes an oil pump, an oil strainer connected to the oil pump, a differential gear mechanism, and a housing case including a first chamber in which the oil strainer is disposed and a second chamber in which the differential gear mechanism is disposed, the second chamber communicating with the first chamber via a communication port, and the oil strainer has a suction port that is not surrounded by a rib, and has a first rib disposed between the suction port and the communication port.

2 Claims, 5 Drawing Sheets

DRIVE POWER TRANSMISSION APPARATUS FOR VEHICLE

INCORPORATION BY REFERENCE

The disclosure of Japanese Patent Application No. 2017-245432 filed on Dec. 21, 2017 including the specification, drawings and abstract is incorporated herein by reference in its entirety.

BACKGROUND

1. Technical Field

The present disclosure relates to a drive power transmission apparatus for a vehicle equipped with an oil strainer.

2. Description of Related Art

There is disclosed a drive power transmission apparatus for a vehicle, including: a differential chamber in which a differential gear mechanism is disposed; an oil pump; a valve body that is hydraulic control means for respective components connected to the oil pump; and an oil chamber in which an oil strainer connected to the valve body is disposed, inside a housing case in which a transmission is housed (e.g., Japanese Patent Application Publication No. 2015-68488). In this drive power transmission apparatus for the vehicle, an oil stored in the oil chamber is brought to flow into a suction port of the oil strainer by a suction force of the oil pump, and the oil having flowed in the suction port is filtered by the oil strainer.

However, the oil chamber communicates with the differential chamber; therefore, the oil stored in the differential chamber, which is agitated by differential gears of the differential gear mechanism and thus contains more air than the oil stored in the oil chamber, flows into the oil chamber. Consequently, abnormal noise might be generated when the oil, which has flowed from the differential chamber into the oil chamber and thus contains more air, is sucked by the oil pump.

SUMMARY

The present disclosure provides a drive power transmission apparatus for a vehicle that suppresses an oil containing more air in a housing case in which a differential gear mechanism is disposed from flowing into a suction port of an oil strainer.

A drive power transmission apparatus for the vehicle according to a first aspect of the disclosure includes: an oil pump; an oil strainer connected to the oil pump; a differential gear mechanism; and a housing case that includes a first chamber in which the oil strainer is disposed and a second chamber in which the differential gear mechanism is disposed, the second chamber communicating with the first chamber via a communication port, wherein a suction port of the oil strainer is not surrounded by a rib, and the oil strainer has a first rib disposed between the suction port and the communication port.

This configuration allows a resistance to suction on the first rib side to be greater than a resistance to suction on the side with no rib. Accordingly, it is possible to suppress the oil containing more air in the second chamber due to the suction by the oil pump from flowing into the oil strainer.

The oil strainer may include a second rib, and ends of the first rib may overlap ends of the second rib on the outer side of the second rib as viewed from the suction port as a center position.

This configuration allows the gaps between the ends of the first rib and the ends of the second rib to open toward the opposite side to the second chamber, and thus it is possible to promote inflow of the oil into the oil strainer from the opposite side to the second chamber due to the suction by the oil pump; therefore, the oil containing more air in the second chamber due to the suction by the oil pump can be suppressed from flowing into the oil strainer.

A drive power transmission apparatus for the vehicle according to a second aspect of the disclosure includes: an oil pump; an oil strainer connected to the oil pump; a differential gear mechanism; and a housing case that includes a first chamber in which the oil strainer is disposed and a second chamber in which the differential gear mechanism is disposed, the second chamber communicating with the first chamber via a communication port, wherein the oil strainer includes ribs that surround a suction port of the oil strainer, the ribs including a first rib disposed between the suction port and the communication port, and a second rib other than the first rib, and a height of the first rib is higher than a height of the second rib.

This configuration allows the resistance to suction on the first rib side to be greater than the resistance to suction on the second rib side. Accordingly, the oil containing more air in the second chamber due to the suction by the oil pump can be suppressed from flowing into the oil strainer.

Ends of the first rib may overlap ends of the second rib on the outer side of the second rib as viewed from the suction port as a center position.

This configuration allows the gaps between the ends of the first rib and the ends of the second rib to open toward the opposite side to the second chamber, and thus it is possible to promote inflow of the oil into the oil strainer from the opposite side to the second chamber due to the suction by the oil pump; therefore, the oil containing more air in the second chamber due to the suction by the oil pump can be suppressed from flowing into the oil strainer.

According to the aspects of the disclosure, in the drive power transmission apparatus for the vehicle, the oil, which is stored in the second chamber in the housing case in which the differential gear mechanism is disposed and thus contains more air, can be suppressed from flowing into the oil strainer.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Specific embodiments to which the present disclosure is applied will be described in detail with reference to the drawings, hereinafter. Note that the present disclosure is not limited to the following embodiments. For the purpose of clarifying the description, the following description and drawings will be appropriately simplified.

First Embodiment

Hereinafter, the first embodiment of a drive power transmission apparatus for a vehicle of the present disclosure will be explained with reference to the drawings.

Figure 1:
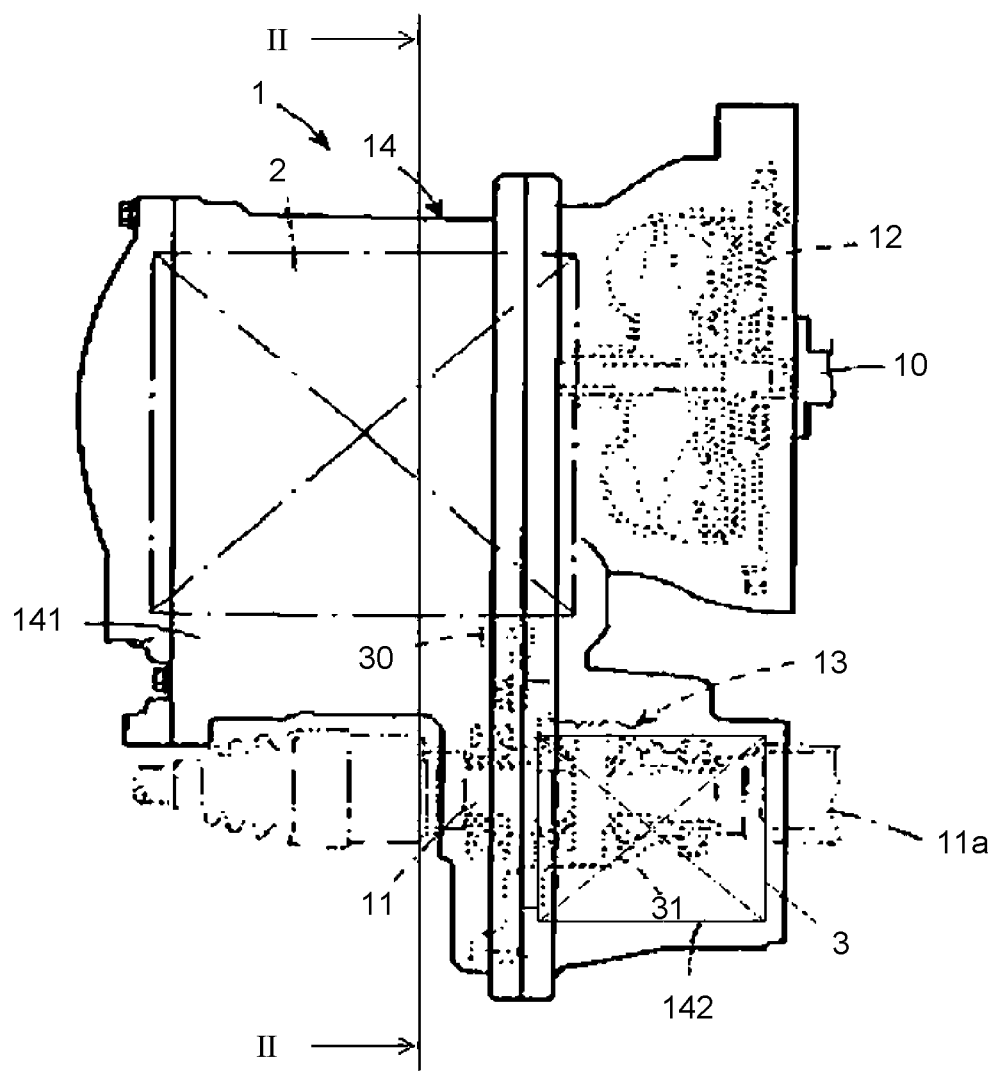
FIG. 1 is a plan view showing a schematic configuration of an entire drive power transmission apparatus for a vehicle according to one embodiment of the present disclosure.

The drive power transmission apparatus 1 for the vehicle shown in FIG. 1 is an apparatus that transmits drive power of an output shaft 10 of an engine (not illustrated) to a pair of right and left axle shafts 11a, 11. A torque converter 12 coupled to the output shaft 10 of the engine, a belt-type continuously variable transmission (not illustrated) as a transmission, a ring gear 30 receiving torque from the transmission, and a differential gear mechanism 13 composed of a differential case 31 and others are incorporated in a housing case 14 of the drive power transmission apparatus 1. Note that the transmission is not limited to only a belt-type continuously variable transmission, and may also be a gear-type multiple-step transmission, or the like, for example.

The housing case 14 is assembled in a state in which an opening of a second case 142 is covered by an outer surface of a first case 141 so as to partition an inside of the first case 141 from an inside of the second case 142. Inside the first case 141, the transmission, a valve body (not illustrate) that performs hydraulic control on respective components of the transmission, etc., and an oil chamber 2 in which an oil strainer 6 described later and others are disposed are provided; and on the other hand, inside the second case 142, a differential chamber 3 in which the differential gear mechanism 13 and others are disposed is provided.

Figure 2:
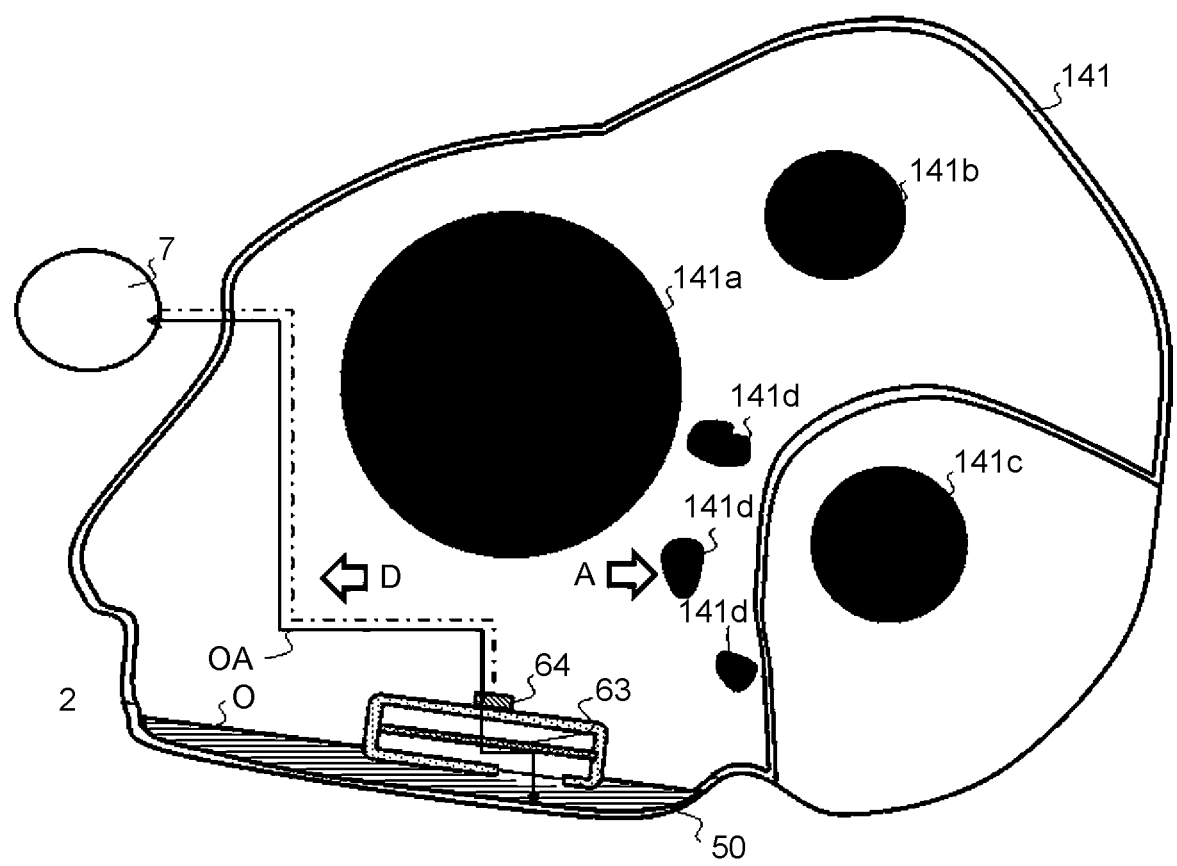
FIG. 2 is a sectional view of the drive power transmission apparatus for the vehicle, taken along line II-II of FIG. 1.

As shown in FIG. 2, a contact surface of the first case 141 to come in contact with an opening of the second case 142 during assembly is provided with an opening for an input shaft 141a, an opening for an output shaft 141b, an opening for a transaxle 141c, and a communication port 141d. This configuration allows the oil chamber 2 to communicate with the differential chamber 3; therefore, an oil agitated by gears, such as the ring gear 30, included in the differential gear mechanism 13 in the differential chamber 3 might flow into the oil chamber 2 through the communication port 141d.

As shown in FIG. 2, an oil pan 50 is attached to a lower part of the housing case 14. In the oil pan 50, an oil used in respective components of the drive power transmission apparatus 1 for the vehicle as a lubrication oil or used as a hydraulic oil drops by its own weight and is stored; and in the same manner, an oil coming from the differential chamber 3 through the communication port 141d also drops by its own weight into the oil pan 50 and is stored.

In the present embodiment, as an oil pump 7, a mechanical-type oil pump is used, for example. The oil pump 7 is activated so as to suck an oil 0 stored in the oil pan 50 into the inside of the oil pump 7 via the oil strainer 6, as indicated by an arrow OA. The oil pump 7 supplies the oil that has been sucked into the oil pump 7 for a clutch and various control valves via oil passages formed at various positions in the drive power transmission apparatus 1 for the vehicle.

Figure 3:
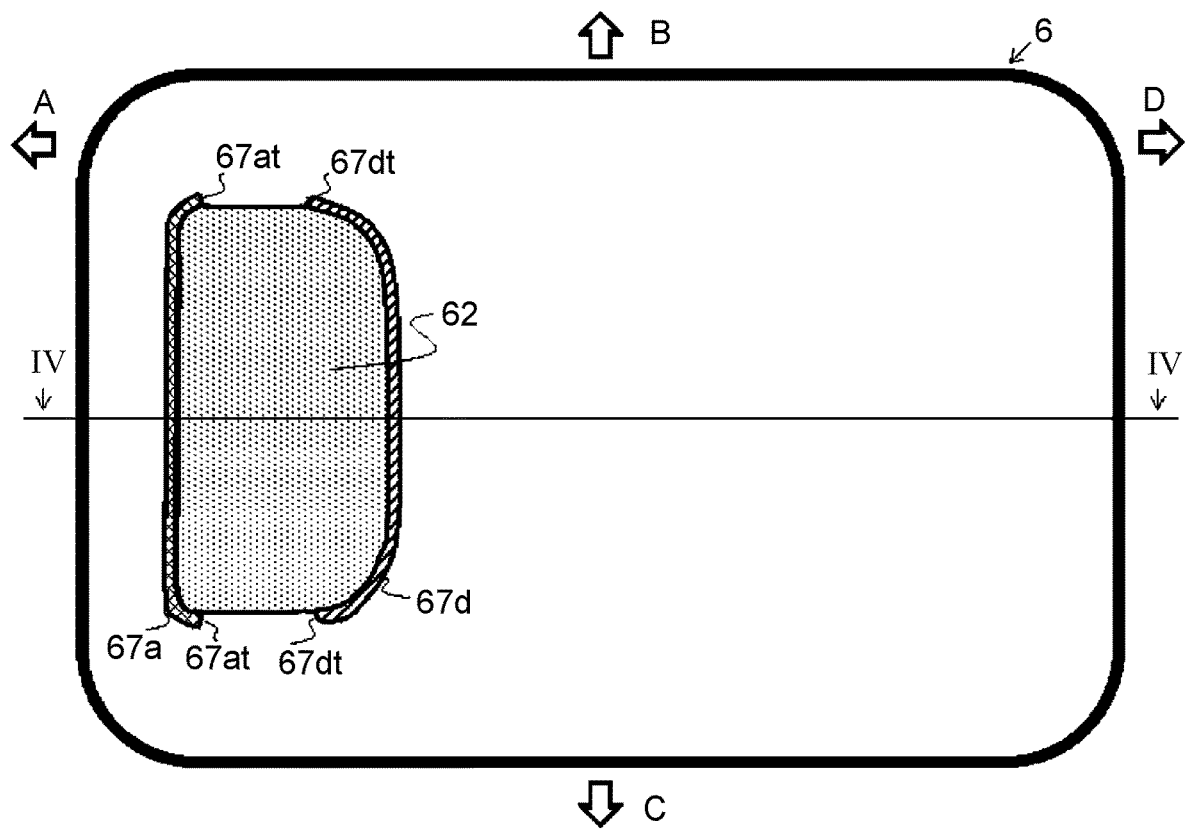
FIG. 3 is a bottom view of the oil strainer according to one embodiment of the present disclosure, as viewed from below.
Figure 4:
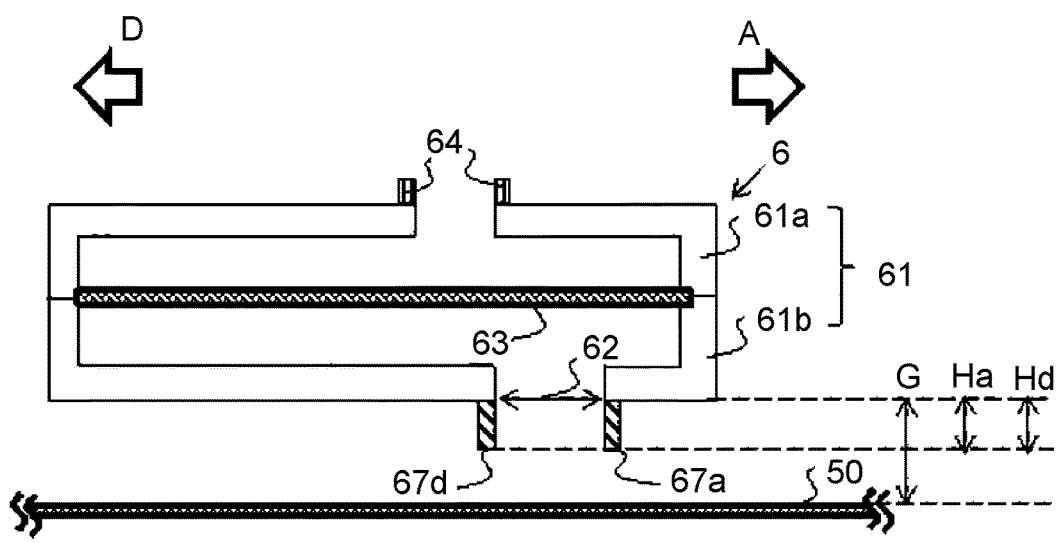
FIG. 4 is a sectional view of the oil strainer taken along line IV-IV of FIG. 3.

The oil strainer 6 will be described in detail with reference to FIG. 3 and FIG. 4. FIG. 3 is a bottom view of the oil strainer 6 included in the drive power transmission apparatus 1 for the vehicle according to the present embodiment, as viewed from below. FIG. 4 is a sectional view of the oil strainer taken along line IV-IV of FIG. 3;

The oil strainer 6 is disposed in the oil pan 50. As shown in FIG. 4, the oil strainer 6 includes: a hollow body 61 including an upper part 61a forming a top cover and a lower part 61b forming a bottom tray; and a filter 63 fixed to the inside of the body 61, and the body 61 is provided with a suction port 62 formed through the lower part 61b and a pump introducing port 64 formed through the upper part 61a.

A predetermined gap G is provided between the suction port 62 and an inner bottom surface of the oil pan 50. This gap G is defined based on consideration of a resistance to suction or the like during oil sucking.

The filter 63 is a filtering member made of non-woven fabric. As shown in FIG. 4, this filter 63 is formed in a size large enough to extend across the entire horizontal plane inside the oil strainer 6 in such a manner as to partition the inside of the body 61 into the upper part 61a and the lower part 61b. Accordingly, when the oil pump 7 sucks the oil into the oil pan 50, the oil flowing through the inside of the oil strainer 6 securely passes through the filter 63 to be filtered. In this manner, the oil pump 7 supplies the oil from which foreign substances are removed by the oil strainer 6 for the clutch and the various control valves, and thus it is possible to suppress malfunction and/or deterioration of the operating functions of the respective components.

As shown in FIG. 4, the lower part 61b of the oil strainer 6 is provided with a rib 67a (an example of a first rib) and a rib 67d (an example of a second rib) on a surface of the lower part 61b facing the oil pan 50. The rib 67a is disposed at a position between the suction port 62 of the oil strainer 6 and the communication port 141d communicating with the differential chamber 3 in such a manner as to extend along a partial periphery of the suction port 62, and the rib 67d is disposed at a position opposite to the communication port 141d side (the arrow D side) of the suction port 62 of the oil strainer 6 with the suction port 62 interposed between the rib 67a and the rib 67d in such a manner as to extend along a partial periphery of the suction port 62. Here, a height Ha of the rib 67a and a height Hd of the rib 67d are equal to each other.

As shown in FIG. 3, respective ends 67at of the rib 67a are apart from respective ends 67dt of the rib 67d, and no ribs are provided between the ends 67at and the ends 67dt. Compared with a drive power transmission apparatus for a vehicle provided with an oil strainer having no first rib, it is possible to further increase a resistance to suction on the communication port 141d side (the arrow A side) of the oil strainer 6. Compared with a drive power transmission apparatus for a vehicle provided with an oil strainer having a rib that surrounds the part of the suction port located opposite to the communication port side, it is possible to further reduce the resistance to suction from parts provided with no ribs of the oil strainer 6 (on the arrow B side and the arrow C side). Accordingly, the oil containing more air in the differential chamber 3 due to suction by the oil pump 7 can be suppressed from flowing into the oil strainer 6.

Second Embodiment

Figure 5:
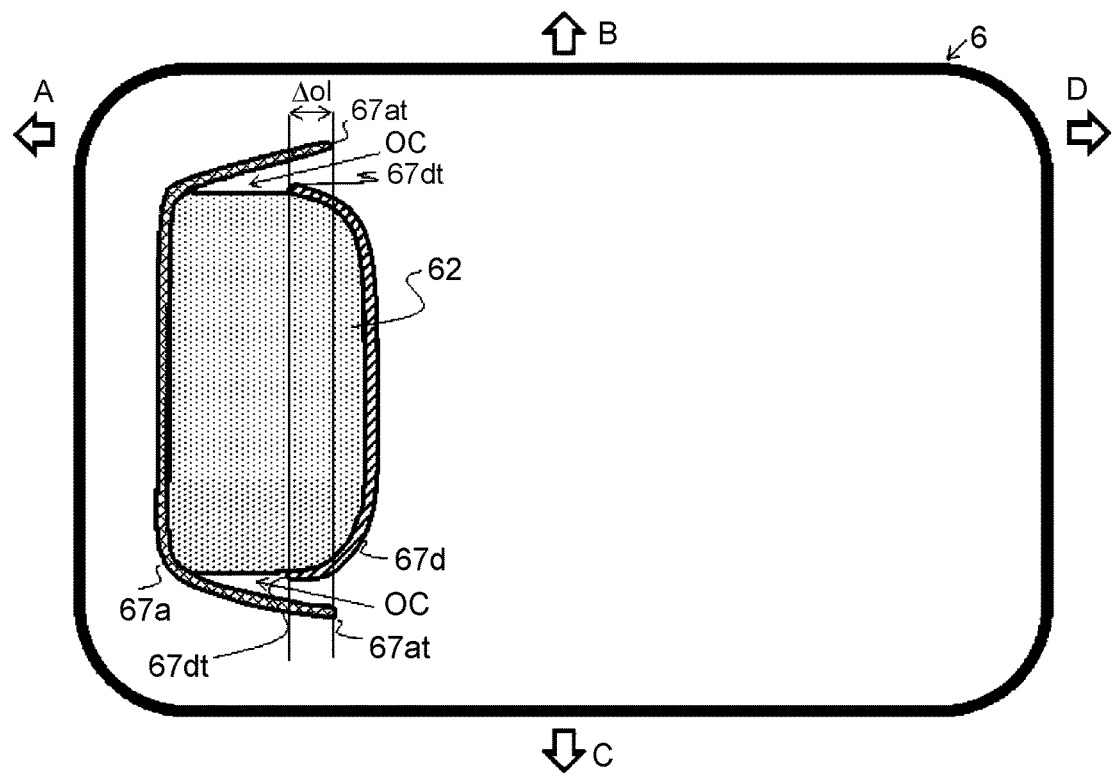
FIG. 5 is a bottom view of the oil strainer according to the second embodiment, as viewed from below.

Next, the second embodiment of the drive power transmission apparatus for the vehicle of the present disclosure will be described with reference to FIG. 5. FIG. 5 is a bottom view of the oil strainer 6 according to the second embodiment, as viewed from below.

As shown in FIG. 5, the respective ends 67*at* of the rib 67*a* are so disposed as to extend in a roughly V-shape opening toward the arrow D side, and the ends 67*at* of the rib 67*a* overlap the ends 67*dt* of the rib 67*d* by Δol on the outer side of the ends 67*dt* of the rib 67*d*. This configuration allows the gaps between the ends 67*at* of the rib 67*a* and the ends 67*dt* of the rib 67*d* to open toward the opposite side to the differential chamber 3 (the arrow D side). Accordingly, it is possible to promote inflow of the oil into the oil strainer 6 from the opposite side to the differential chamber 3 (the arrow D side) through suction by the oil pump 7, as indicated by an arrow OC; therefore, the oil that contains more air in the differential chamber 3 due to the suction by the oil pump 7 can be suppressed from flowing into the oil strainer 6.

Third Embodiment

Figure 6:
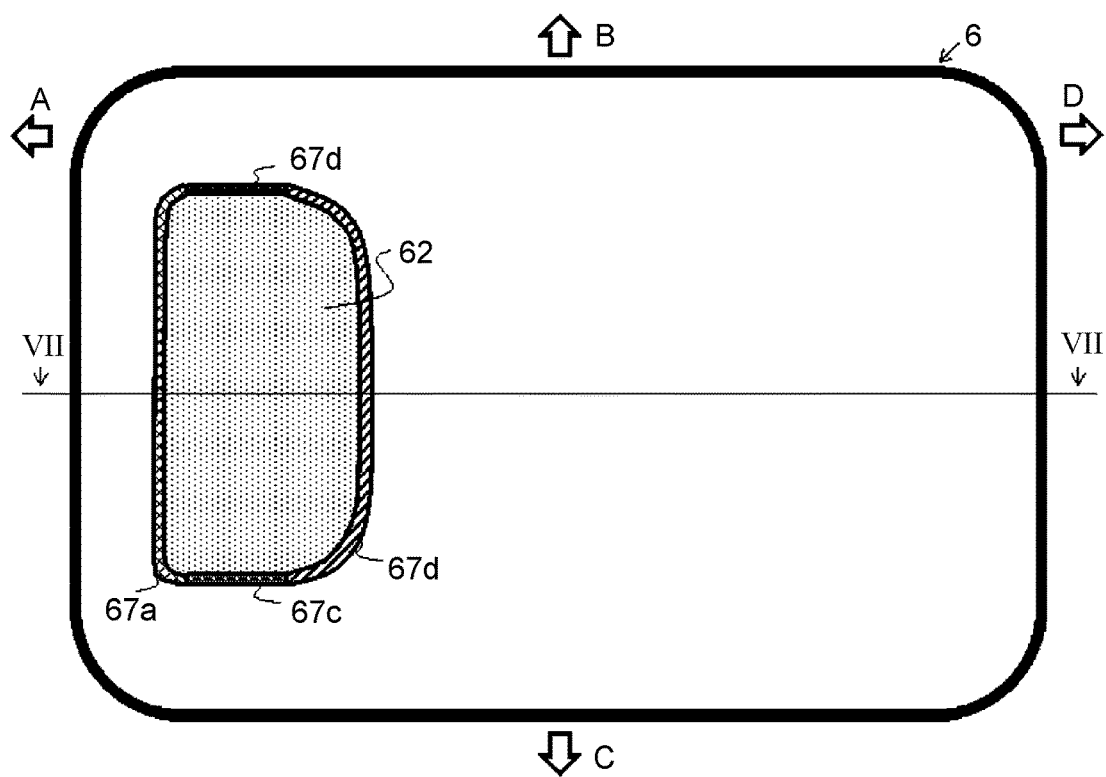
FIG. 6 is a bottom view of the oil strainer according to the third embodiment, as viewed from below.
Figure 7:
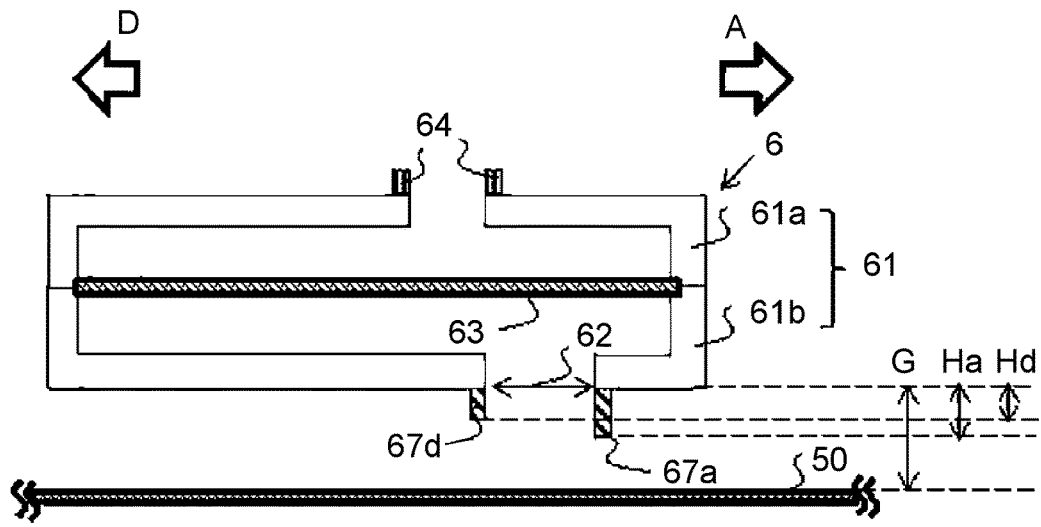
FIG. 7 is a sectional view of the oil strainer taken along line VII-VII of FIG. 6.

Next, the third embodiment of the drive power transmission apparatus for the vehicle of the present disclosure will be described with reference to FIG. 6 and FIG. 7. FIG. 6 is a bottom view of the oil strainer 6 according to the third embodiment, as viewed from below. FIG. 7 is a sectional view of the oil strainer 6 taken along line VII-VII of FIG. 6.

As shown in FIG. 7, the height Ha of the rib 67*a* disposed on the arrow A side of the suction port 62 of the oil strainer 6 is set to be higher than the height of the rib 67*d* disposed on the arrow D side of the suction port 62 of the oil strainer 6. Similarly, the height Ha of the rib 67*a* disposed on the arrow A side is set to be higher than a height Hb of the rib 67*b* on the arrow B side and a height Hc of the rib 67*c* on the arrow C side of the suction port 62 of the oil strainer 6, as shown in FIG. 6. Compared with a drive power transmission apparatus for a vehicle including the oil strainer with the rib 67*a* having a lower height than the heights of the rib 67*b* to the rib 67*d*, it is possible to further increase a relative resistance to suction on the arrow A side of the oil strainer 6 with respect to those on the arrow B side and the arrow D side of the oil strainer 6. Accordingly, the oil that contains more air in the differential chamber 3 due to the suction by the oil pump 7 can be suppressed from flowing into the oil strainer 6.

Fourth Embodiment

Figure 8:
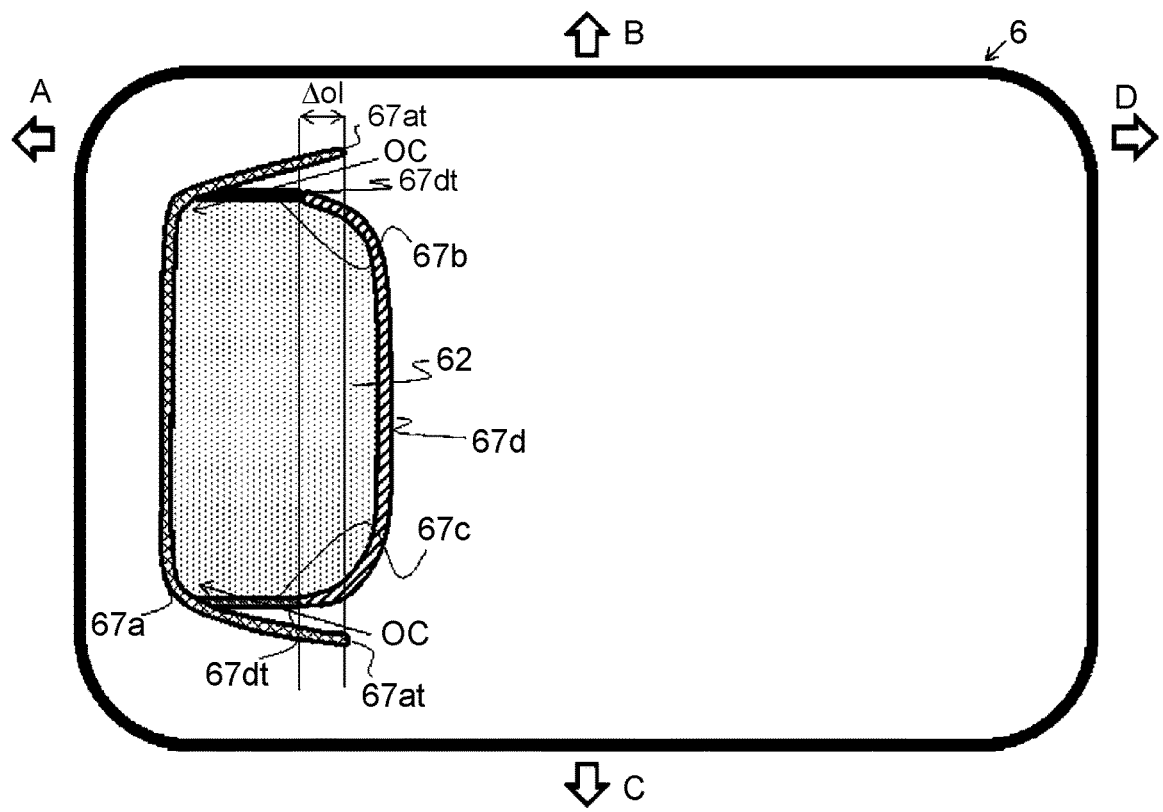
FIG. 8 is a bottom view of the oil strainer according to the fourth embodiment, as viewed from below.

Next, the fourth embodiment of the drive power transmission apparatus for the vehicle of the present disclosure will be described with reference to FIG. 8. FIG. 8 is a bottom view of the oil strainer 6 according to the fourth embodiment, as viewed from below.

The heights Ha to Hd of the rib 67*a* to the rib 67*d* of the oil strainer 6 shown in FIG. 8 are set to be Ha>Hd>Hb=Hc. As shown in FIG. 8, the respective ends 67*at* of the rib 67*a* are so disposed as to extend in a roughly V-shape opening the arrow D side, and the respective ends 67*at* of the rib 67*a* overlap the respective ends 67*dt* of the rib 67*d* by Δol on the outer side of the ends 67*dt* of the rib 67*d*. This configuration allows the gaps between the ends 67*at* of the rib 67*a* and the ends 67*dt* of the rib 67*d* to open toward the opposite side to the differential chamber 3 (the arrow D side). Accordingly, it is possible to promote inflow of the oil into the oil strainer 6 from the opposite side to the differential chamber 3 (the arrow D side) through suction by the oil pump 7 as shown by an arrow OC; therefore, the oil that contains more air in the differential chamber 3 due to the suction by the oil pump 7 can be suppressed from flowing into the oil strainer 6.

The present disclosure is not limited to the above embodiments, and may be embodied by appropriately changing these embodiments without departing from the scope of the present disclosure. The followings (a) to (e) are examples thereof.

(a) In the above first to fourth embodiments, the ribs 67*a* to 67*d* are arranged at the nearest positions to the suction port 62, but the ribs 67*a* to 67*d* may be arranged outwardly apart from the suction port.

(b) In the above first to fourth embodiments, the suction port 62 is configured to have an oval sectional shape, but the suction port 62 may be configured to have a circular sectional shape or a rectangular sectional shape, etc.

(c) In the above first and second embodiments, the parts having no ribs are provided on the arrow B side and on the arrow C side of the suction port 62, but the part having no rib may be provided at one position on at least one of the arrow B side, the arrow C side, and the arrow D side of the suction port 62.

(d) In the above third embodiment, the height Ha of the rib 67*a* is set to be higher than the respective heights Hb, Hc, Hd of the other ribs, but the height Ha of the rib 67*a* may be higher than at least one of the heights Hb, Hc, Hd of the other ribs.

(e) In the above fourth embodiment, the height Ha of the rib 67*a* is set to be higher than the height Hd of the rib 67*d*, but may be equal to or lower than the height Hd of the rib 67*d* as long as the height Ha of the rib 67*a* and the height Hd of the rib 67*d* are higher than the height Hb of the rib 67*b* and the height Hc of the rib 67*c*.

What is claimed is:

1. A drive power transmission apparatus for a vehicle, comprising:
    an oil pump;
    an oil strainer with a filter within the oil strainer, the oil strainer being connected to the oil pump;
    a differential gear mechanism; and
    a housing case that includes a first chamber in which the oil strainer is disposed and a second chamber in which the differential gear mechanism is disposed, the second chamber communicating with the first chamber via a communication port,
    wherein a suction port of the oil strainer is not surrounded by a rib on an outer surface of the oil strainer;
    wherein the oil strainer has a first rib disposed between the suction port and the communication port, and disposed on the outer surface of the oil strainer;
    wherein the oil strainer includes a second rib; and
    wherein ends of the first rib overlap ends of the second rib on an outer side of the second rib as viewed from the suction port as a center position.

2. A drive power transmission apparatus for a vehicle, comprising:
    an oil pump;
    an oil strainer with a filter within the oil strainer, the oil strainer being connected to the oil pump;
    a differential gear mechanism; and
    a housing case that includes a first chamber in which the oil strainer is disposed and a second chamber in which the differential gear mechanism is disposed, the second chamber communicating with the first chamber via a communication port,
wherein the oil strainer includes ribs that surround a suction port of the oil strainer on an outer surface of the oil strainer,
wherein the ribs including a first rib disposed between the suction port and the communication port, and a second rib other than the first rib,
wherein a height of the first rib is higher than a height of the second rib, and
wherein ends of the first rib overlap ends of the second rib on an outer side of the second rib as viewed from the suction port as a center position.

* * * * *